(12) United States Patent
Lussier

(10) Patent No.: US 7,494,032 B2
(45) Date of Patent: Feb. 24, 2009

(54) SLIDING BED ACCESSORY ARRANGEMENT

(75) Inventor: Paul B. Lussier, Royal Oak, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 763 days.

(21) Appl. No.: 11/094,479

(22) Filed: Mar. 31, 2005

(65) Prior Publication Data

US 2006/0226189 A1 Oct. 12, 2006

(51) Int. Cl.
*B60R 7/00* (2006.01)
*B60R 9/00* (2006.01)

(52) U.S. Cl. ....................... 224/404; 224/281

(58) Field of Classification Search ............... 224/403, 224/404, 281, 310, 321, 315, 542; 410/104, 410/129, 130, 137, 138, 139, 143, 150; 296/37.6, 296/100.17; 312/330.1, 334.8, 334.7
See application file for complete search history.

(56) References Cited

U.S. PATENT DOCUMENTS

| | | | | |
|---|---|---|---|---|
| 4,522,326 A * | 6/1985 | Tuohy, III | ................... | 224/310 |
| 4,635,992 A * | 1/1987 | Hamilton et al. | ........... | 296/37.6 |
| 5,037,153 A * | 8/1991 | Stark | ........................ | 296/37.6 |
| 5,088,636 A * | 2/1992 | Barajas | ....................... | 224/281 |
| 5,688,087 A * | 11/1997 | Stapleton et al. | ............ | 410/150 |
| 5,924,616 A * | 7/1999 | Shives | ........................ | 224/404 |
| 6,010,048 A * | 1/2000 | Settelmayer | ................ | 224/321 |
| 6,179,179 B1 * | 1/2001 | Potter et al. | .................. | 224/321 |
| 6,264,083 B1 * | 7/2001 | Pavlick et al. | ............... | 224/404 |
| 6,629,807 B2 | 10/2003 | Bernardo | | |
| 6,722,541 B1 * | 4/2004 | Aftanas et al. | .............. | 224/403 |
| 7,159,918 B2 * | 1/2007 | Lussier | .................... | 296/26.09 |
| 7,214,018 B2 * | 5/2007 | Lussier | ...................... | 410/130 |
| 2002/0048495 A1 | 4/2002 | Anderson et al. | | |
| 2004/0047703 A1 | 3/2004 | Bernardo | | |
| 2005/0051585 A1 * | 3/2005 | Kamiya et al. | .............. | 224/321 |
| 2005/0152761 A1 * | 7/2005 | Silamianos et al. | ......... | 410/130 |
| 2006/0093454 A1 * | 5/2006 | Kmita et al. | ................ | 410/150 |

* cited by examiner

*Primary Examiner*—Nathan J Newhouse
*Assistant Examiner*—Corey N Skurdal
(74) *Attorney, Agent, or Firm*—Global IP Counselors, LLP

(57) ABSTRACT

A sliding bed accessory arrangement is provided with a sliding bed accessory, such as an upper bed tray, that is configured to slide between and retained in several different positions within a vehicle cargo bed. The sliding bed accessory arrangement has a pair of tracks fixedly attached to opposite sides of a vehicle cargo area with a pair of mounting arrangements slideably supporting the bed accessory in the tracks. Each of the mounting arrangements has an elongated rail and a pair of connectors coupled to opposite ends of the elongated rail to retain and stabilize opposite ends of the elongated rail within the track. The mounting arrangements are configured such that the elongated rails do not need to be longitudinally inserted into the tracks.

20 Claims, 17 Drawing Sheets

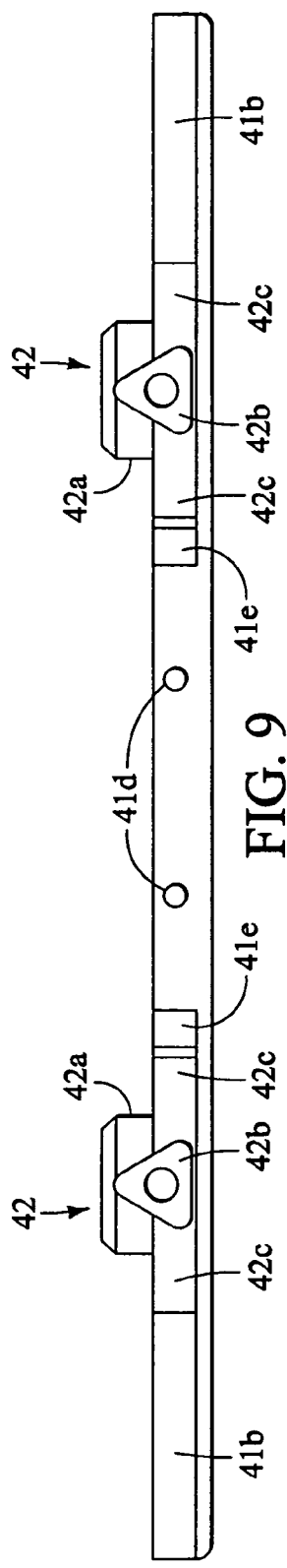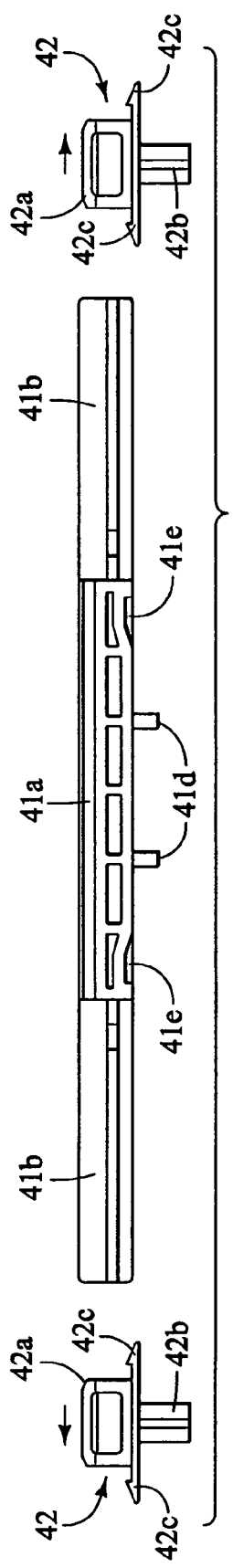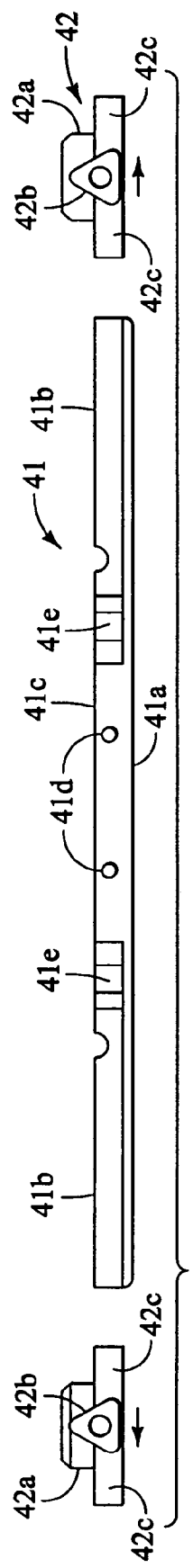

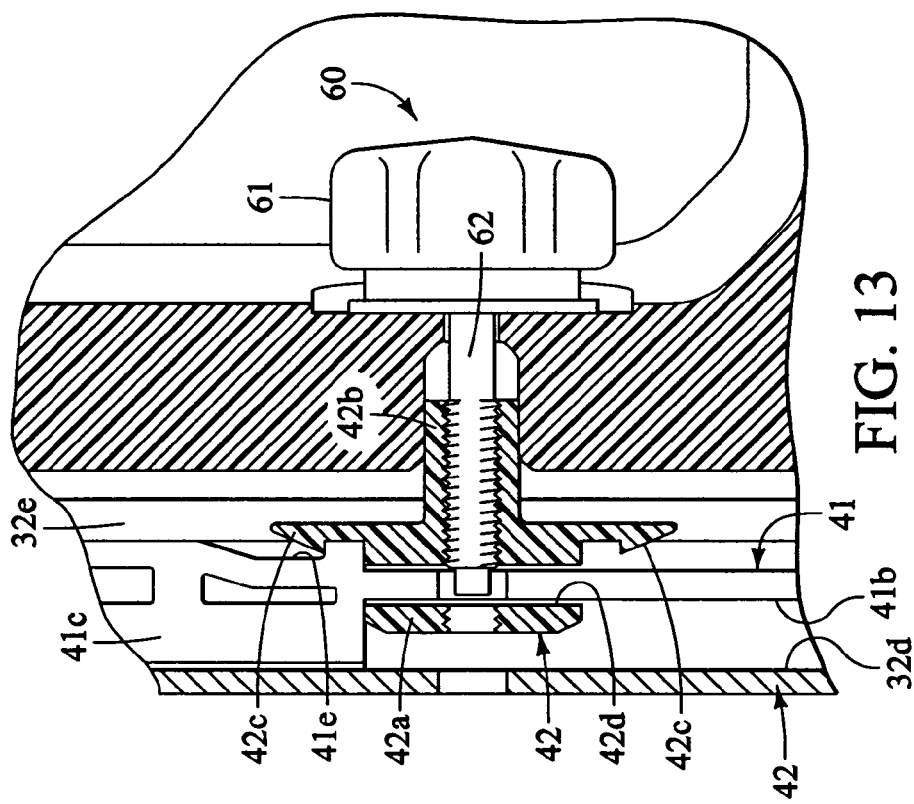
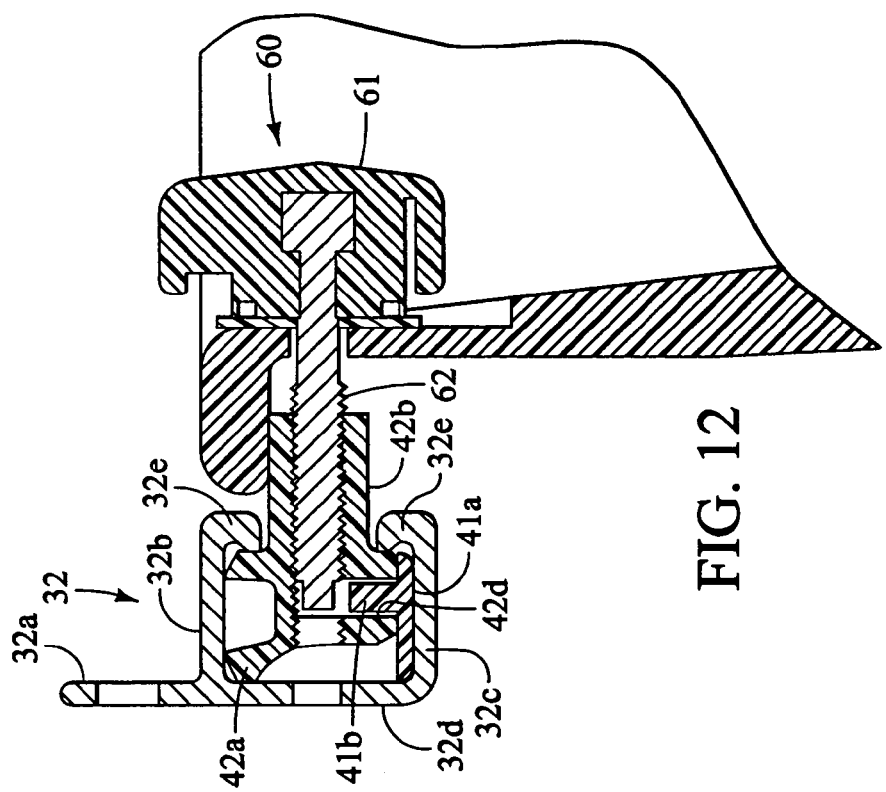

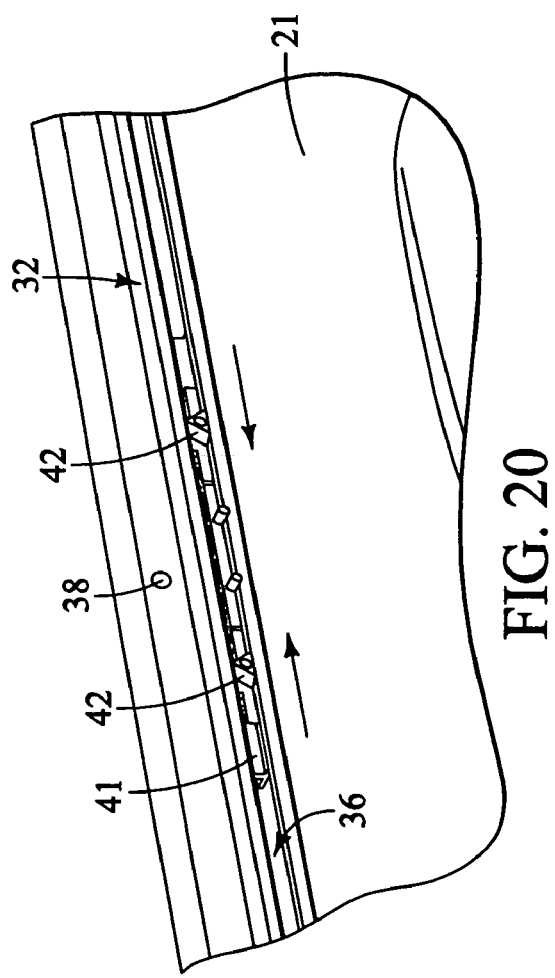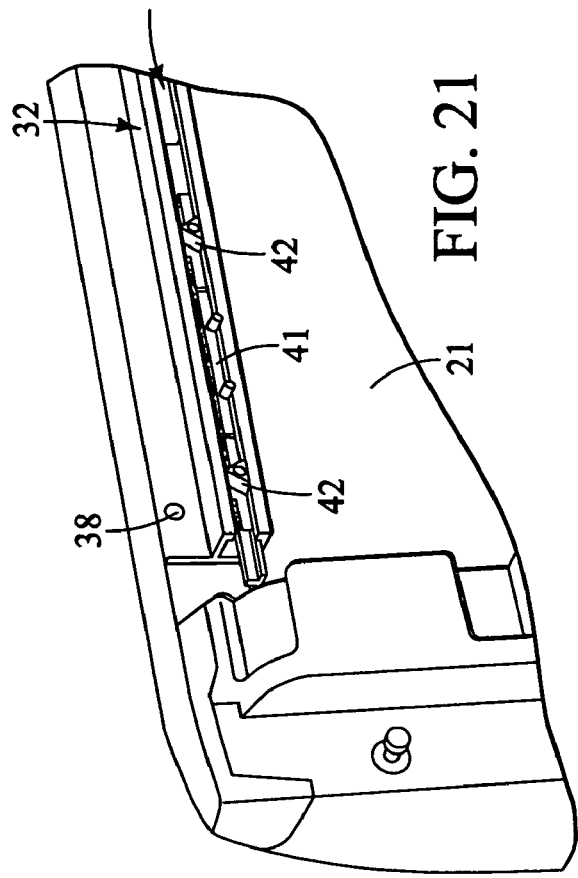

US 7,494,032 B2

SLIDING BED ACCESSORY ARRANGEMENT

BACKGROUND OF THE INVENTION

1. Field of the Invention

The present invention generally relates to a sliding bed accessory arrangement for a vehicle cargo area. More specifically, the present invention relates to a sliding bed accessory, such as an upper bed tray, which can be retained in several different positions within a pick-up truck cargo bed.

2. Background Information

Pick-up trucks have increased in popularity in recent years. Some pick-up trucks are used primarily for work and others primarily for recreation. Many trucks do double-duty supporting both of these spheres of activity. Basically a pick-up truck has a storage bed in which a tailgate is pivotally mounted to side support portions of the storage bed. The explosion in the popularity of pick-up trucks and/or sport utility trucks (SUTs) has fueled a proliferation of new body configurations. Trucks are offered as standard cabs, king cabs, crew cabs, and the like. Likewise, truck interiors have been adapted to meet the needs for more comfort, more passenger capacity, and the like.

Recently, the cargo area of the pick-up truck has undergo a similar evolution. Typically, a standard full-sized pick-up bed is little more than a large empty volume with a few tie-down points scattered along the perimeter of its interior walls or along a bed rail. Generally speaking, bed usage may be grouped into three broad categories: hauling, securing, and separating items in the payload. Most truck users need to perform each of these tasks with some frequency. Yet the demands placed on the bed for hauling are significantly different from those needed to secure or separate items in and around the bed. Thus, various bed accessories have been offered to allow customization of the bed to suit a particular need.

For example, some automobile manufacturers have made track systems in which a variety of bed accessories can be easily attached. Some of the bed accessories that are currently available on the market include a bed divider, a bed extender and a tray or box. Currently, pick-up trucks are available with a track system such as the one disclosed in U.S. Patent Publication No. 2002/0048495 to Anderson et al. This track system is configured to support a variety of bed accessories. Examples of some sliding bed accessories are disclosed in the following U.S. publications: U.S. Pat. No. 6,629,807 to Bernardo; and U.S. Patent Publication No. 2004/0047703 to Bernardo. While many of these systems are at least partially effective, they are not necessarily designed to interface with the truck in an optimum manner from a functional, structural, and aesthetic standpoint.

In view of the above, it will be apparent to those skilled in the art from this disclosure that there exists a need for an improved sliding bed accessory arrangement. This invention addresses this need in the art as well as other needs, which will become apparent to those skilled in the art from this disclosure.

SUMMARY OF THE INVENTION

One object of the present invention is to provide a sliding bed accessory arrangement that is configured and arranged to be installed into a track system that has its front and rear open end located adjacent the front cargo wall and a rear abutment (taillight housing).

In order to achieve the above object and other objects of the present invention, a sliding bed accessory arrangement is provided that basically comprises a vehicle cargo area, a first track, a second track, a first mounting arrangement, a second mounting arrangement and a bed accessory. The vehicle cargo area includes a bed floor, a front cargo wall disposed on a forward end of the bed floor, a first side cargo wall disposed on a first lateral side of the bed floor, and a second side cargo wall disposed on a second lateral side of the bed floor. The first track is fixedly attached to the first side cargo wall of the vehicle cargo area. The second track is fixedly attached to the second side cargo wall of the vehicle cargo area in a parallel, spaced arrangement relative to the first track. The first mounting arrangement a first elongated rail and a pair of first connectors. The first elongated rail is slideably disposed on one interior surface of the first track. The first connectors are coupled to opposite ends of the first elongated rail. The first connectors are configured and dimensioned relative to the first elongated rail and the first track to retain and stabilize opposite ends of the first elongated rail within the first track. The second mounting arrangement includes a second elongated rail and a pair of second connectors. The second elongated rail is slideably disposed on one interior surface of the second track. The second connectors are coupled to opposite ends of the second elongated rail. The second connectors are configured and dimensioned relative to the second elongated rail and the second track to retain and stabilize opposite ends of the second elongated rail within the second track. The bed accessory has first and second sides rigidly attached to the first and second mounting arrangements.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is a side elevational view of one of the mounting arrangements of the sliding bed accessory arrangement in accordance with the present invention;

FIG. 10 is an exploded top plan view of the mounting arrangement of the sliding bed accessory arrangement illustrated in FIG. 9 in accordance with the present invention;

FIG. 11 is an exploded side elevational view of the mounting arrangement of the sliding bed accessory arrangement illustrated in FIGS. 9 and 10 in accordance with the present invention;

FIG. 12 is a cross sectional view of one of the mounting arrangements of the sliding bed accessory arrangement as viewed along section line 12-12 of FIG. 6;

FIG. 13 is a cross sectional view of one of the mounting arrangements of the sliding bed accessory arrangement as viewed along section line 13-13 of FIG. 6;

FIG. 20 is a partial perspective view of a portion of the cargo area with the connectors being connected to the elongated rail in one of the tracks in accordance with the present invention;

FIG. 21 is a partial perspective view of a portion of the cargo area with the connectors being more firmly connected to the elongated rail in one of the tracks in accordance with the present invention.

DETAILED DESCRIPTION OF THE PREFERRED EMBODIMENTS

Figure 1:
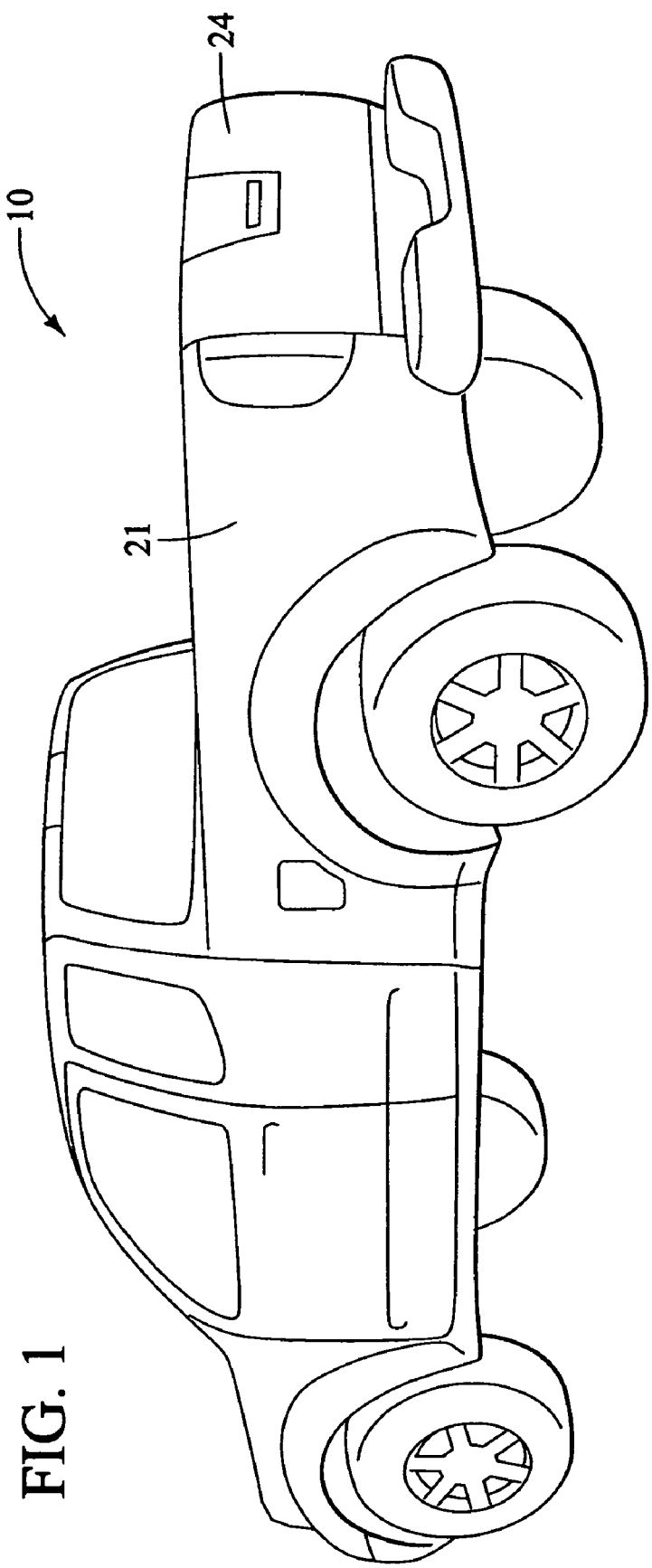
FIG. 1 is a rear side perspective view of a vehicle (pick-up truck) having a sliding bed accessory arrangement in accordance with one embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-5, a vehicle or pick-up truck 10 is illustrated that has a truck bed or vehicle cargo area 12 with a sliding bed accessory arrangement 14 in accordance with a first embodiment of the present invention. However, it will be apparent to those skilled in the art from this disclosure that the sliding bed accessory arrangement 14 of the present invention can be utilized in any of a variety of vehicles having a vehicle cargo area, such as vans and the like.

The vehicle cargo area 12 of the vehicle 10 basically has a bed floor 16, a front cargo wall 18, a pair of side cargo walls 21 and 22 and a rear tailgate 24. The front cargo wall 18 is disposed on a forward end of the bed floor 16 and interconnects the forward ends of the side cargo walls 21 and 22. The first side cargo wall 21 is disposed on a first lateral side of the bed floor 16, while the second side cargo wall 22 is disposed on a second lateral side of the bed floor 16. The tailgate 24 is pivotally coupled to the rearward ends of the side cargo walls 21 and 22. The vehicle cargo area 12 of the vehicle 10 is a relatively conventional structure that is well known in the art. Since vehicle cargo areas of pick-up trucks are well known in the art, the vehicle cargo area 12 will not be discussed or illustrated in detail herein.

Turning now to FIGS. 3-7, the sliding bed accessory arrangement 14 basically has a pair of roller tracks 32, a first mounting arrangement 33, a second mounting arrangement 34, and a sliding bed accessory or upper truck bed tray 35. It will be apparent to those skilled in the art from this disclosure that other sliding bed accessories can be mounted in accordance with the present invention. A first one of the tracks 32 is fixedly attached to the first side cargo wall 21 of the vehicle cargo area 12, while a second one of the tracks 32 is fixedly attached to the second side cargo wall 22 of the vehicle cargo area 12 in a parallel, spaced arrangement relative to the first one of the tracks. The upper truck bed tray 35 is slideably supported on the tracks 32 by the first and second mounting arrangements 33 and 34.

Figure 2:
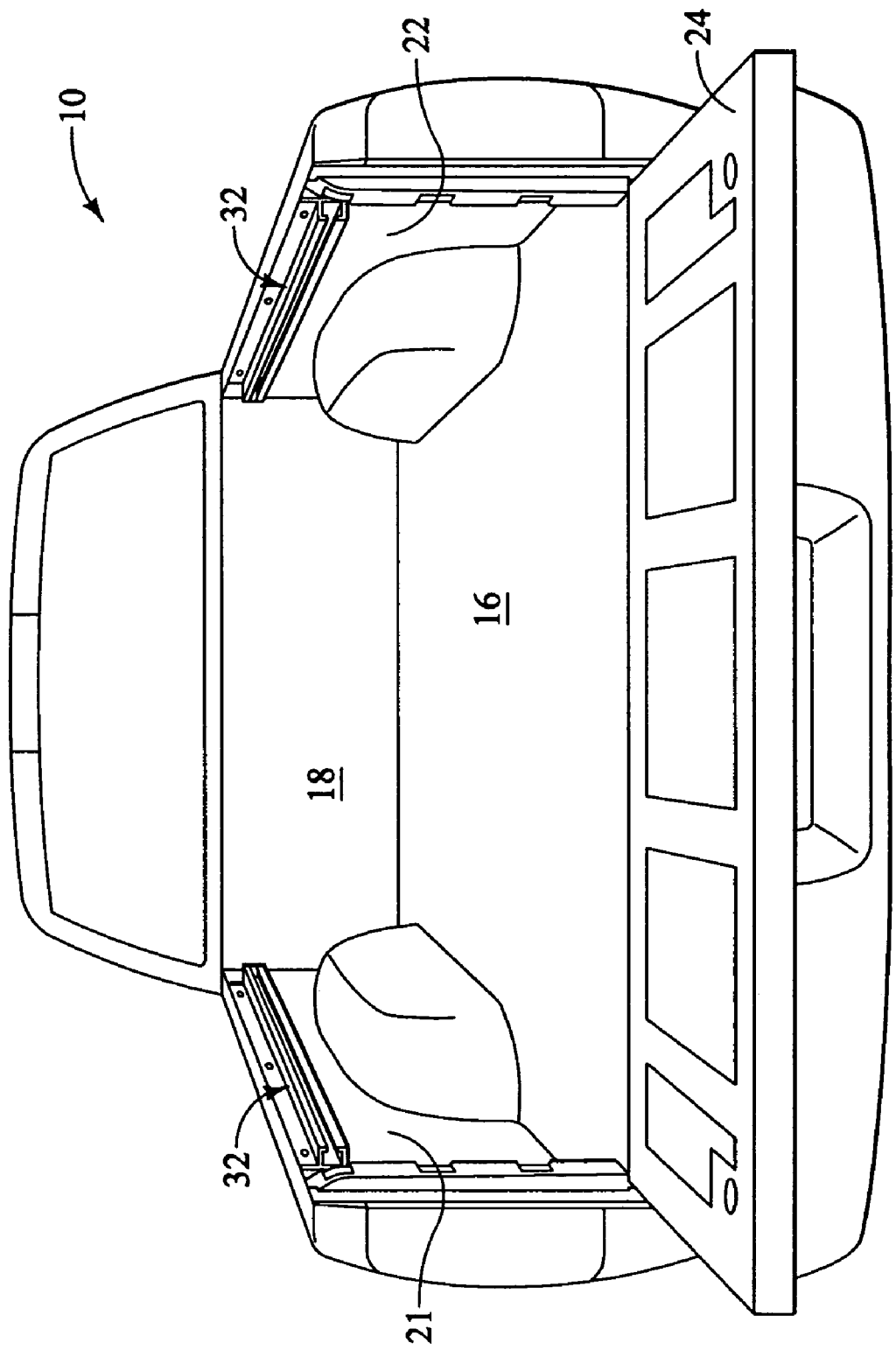
FIG. 2 is a rear elevational view of the vehicle illustrated in FIG. 1 having a pair of tracks that are used in the sliding bed accessory arrangement in accordance with the present invention.
Figure 3:
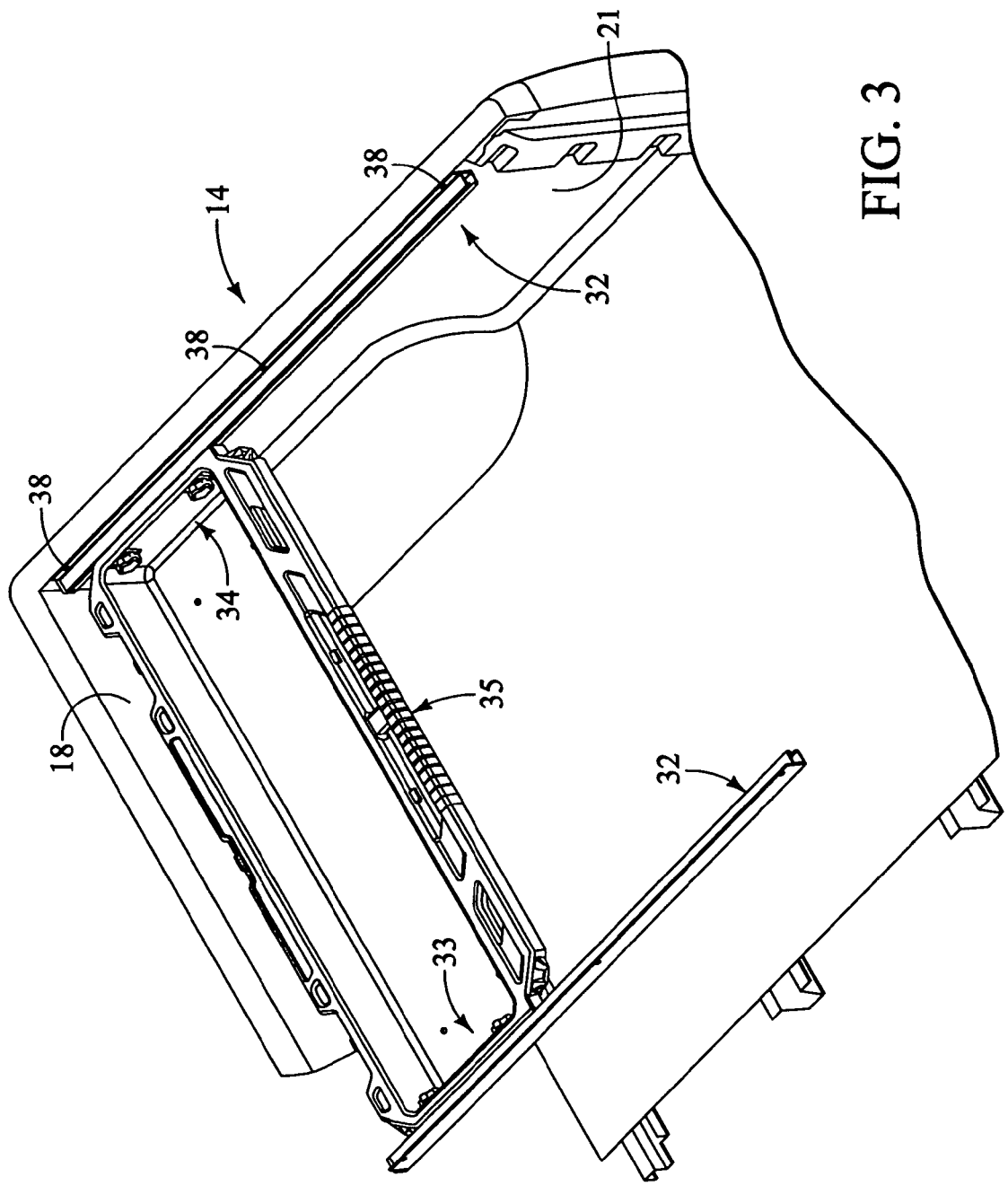
FIG. 3 is a partial top perspective view of a portion of the cargo area with an upper tray installed in the tracks in accordance with the present invention.
Figure 4:
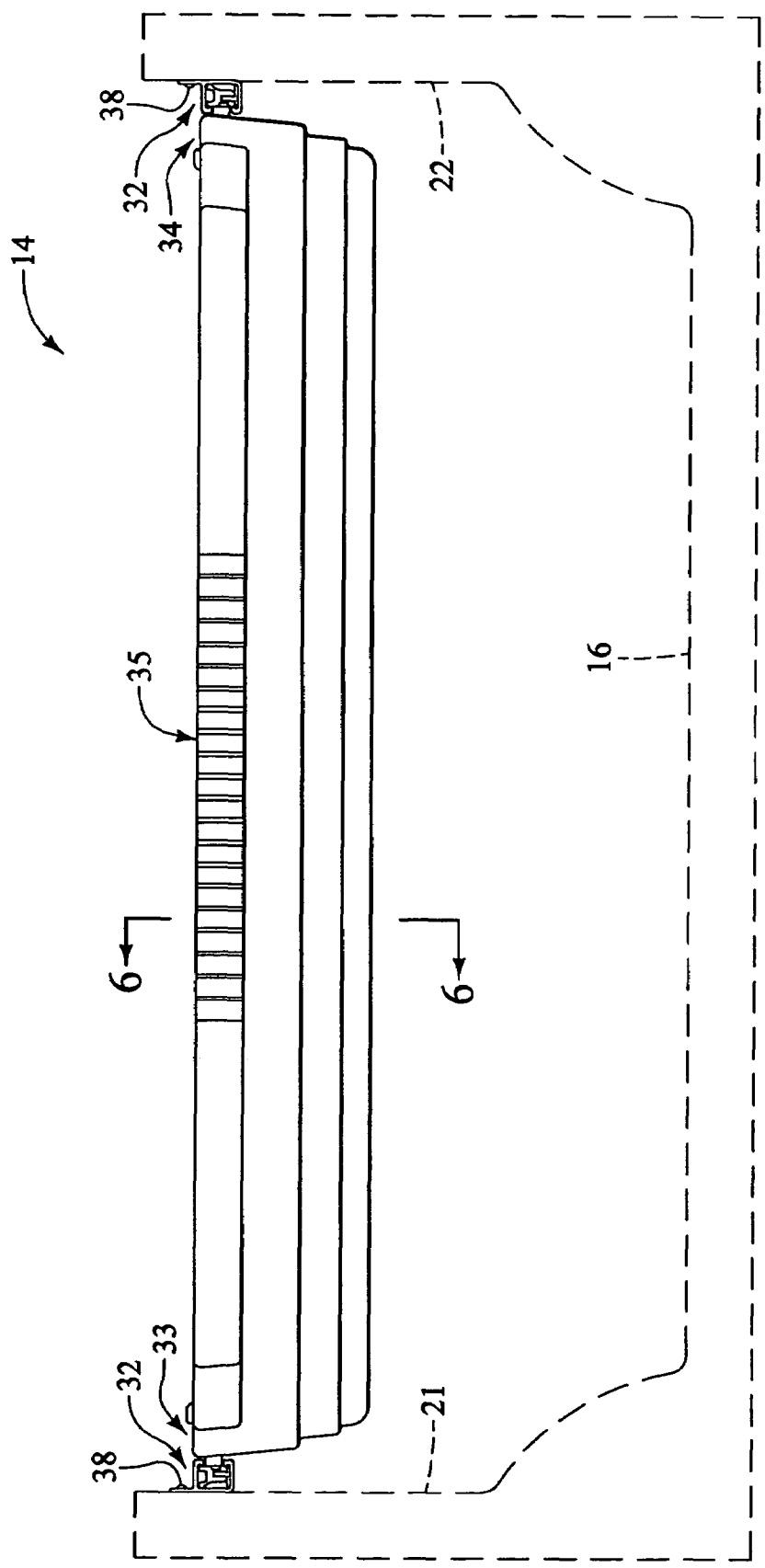
FIG. 4 is a rear elevational view of the sliding bed accessory arrangement disposed in the vehicle bed (shown in phantom lines) in accordance with the present invention.
Figure 5:
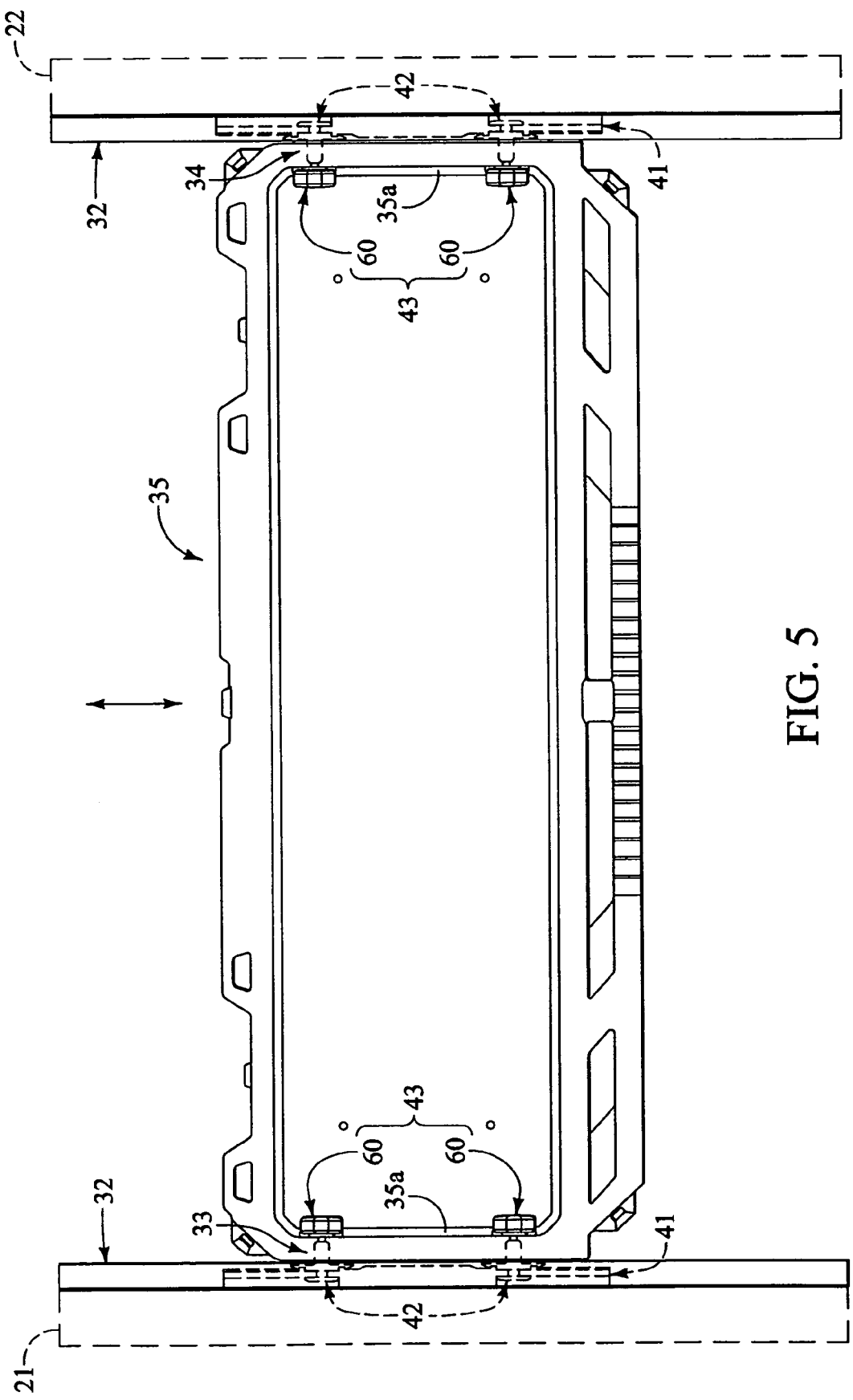
FIG. 5 is a top plan view of the sliding bed accessory arrangement in accordance with the present invention with the vehicle bed shown in phantom lines.
Figure 6:
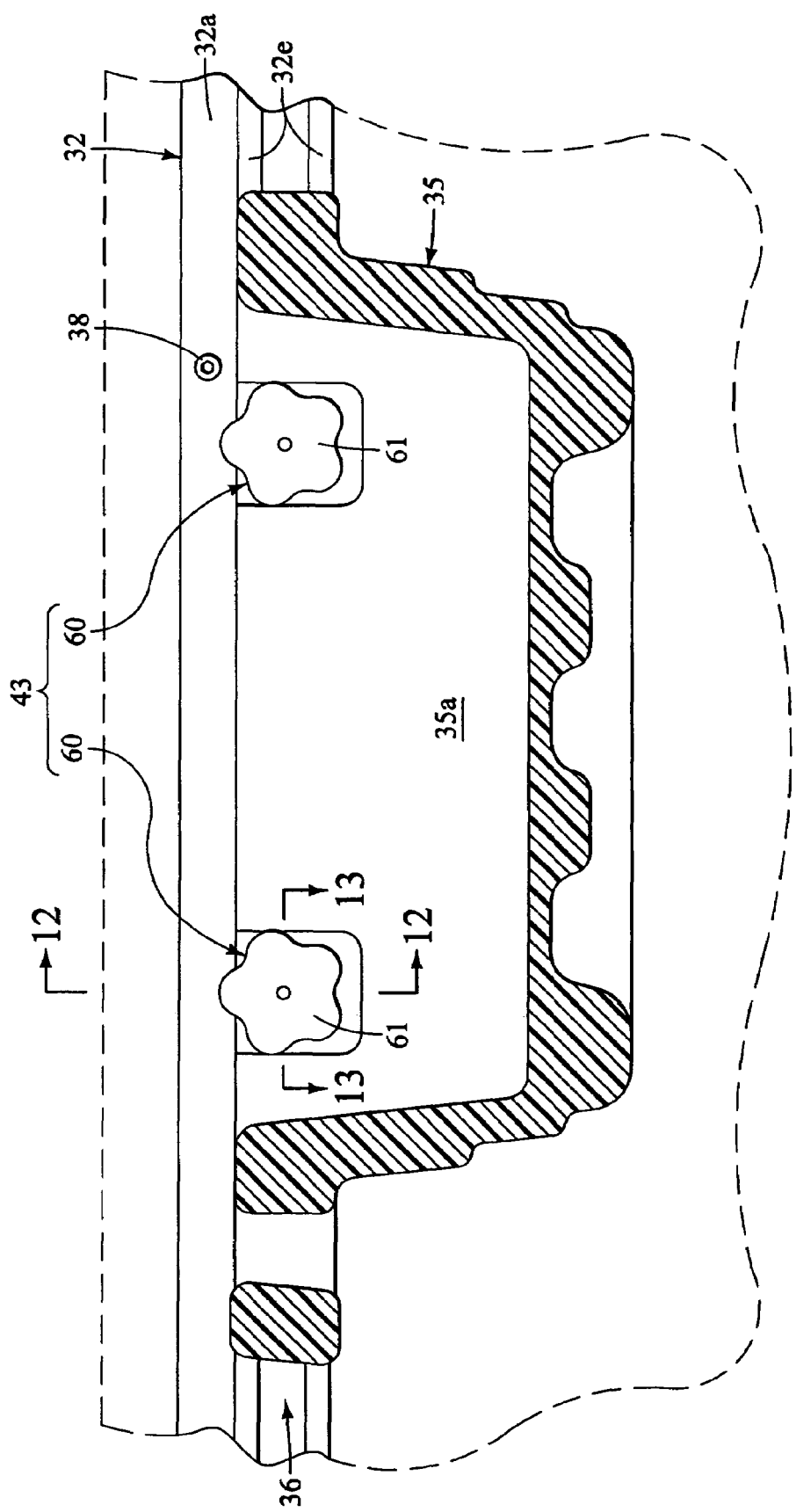
FIG. 6 is a transverse cross sectional view of the sliding bed accessory arrangement as viewed along section line 6-6 of FIG. 4 with the vehicle bed shown in phantom lines.

As seen in FIGS. 2-4, both of the tracks 32 have generally transverse C-shaped cross sections that open towards each other. The tracks 32 are preferably constructed of a hard rigid material such as metal. The tracks 32 are structurally identical to each other, but mounted as mirror images of each other. The first and second mounting arrangements 33 and 34 are slideably mounted within the tracks 32, as explained below. Since the tracks 32 are structurally identical to each other, only one of the tracks 32 will be discussed and/or illustrated in detail.

Figure 14:
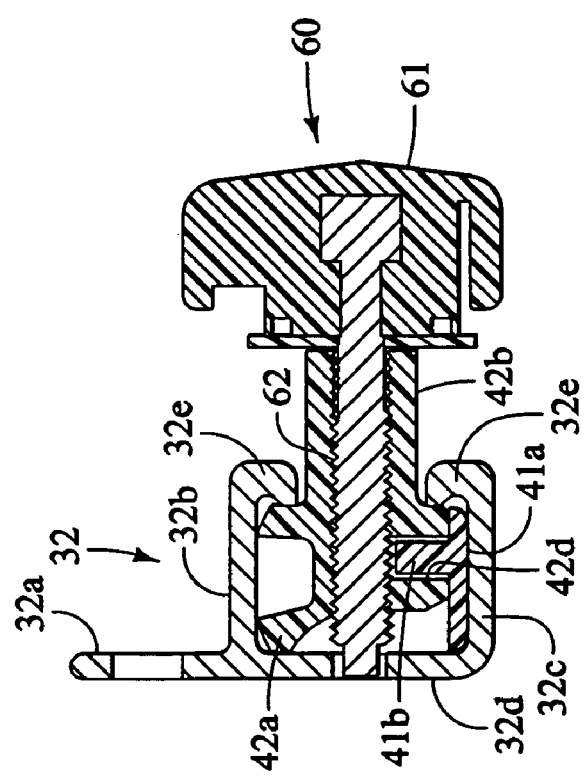
FIG. 14 is a cross sectional view of the mounting arrangement shown in FIG. 12, as viewed along section line 12-12 of FIG. 6, but with the upper tray removed.

As best seen in FIGS. 12 and 14, the roller track 32 has a mounting flange 32a, an upper track portion 32b, a lower track portion 32c, a rear wall portion 32d and a pair of retaining lips 32e. The roller track 32 is a channel shaped member with the retaining lips 32e being turned inwardly to define a longitudinal slot or opening 36. The roller tracks 32 are fixedly attached to the first and second side cargo walls 21 and 22 of the vehicle cargo area 12 by a plurality of fasteners 38.

Figure 18:
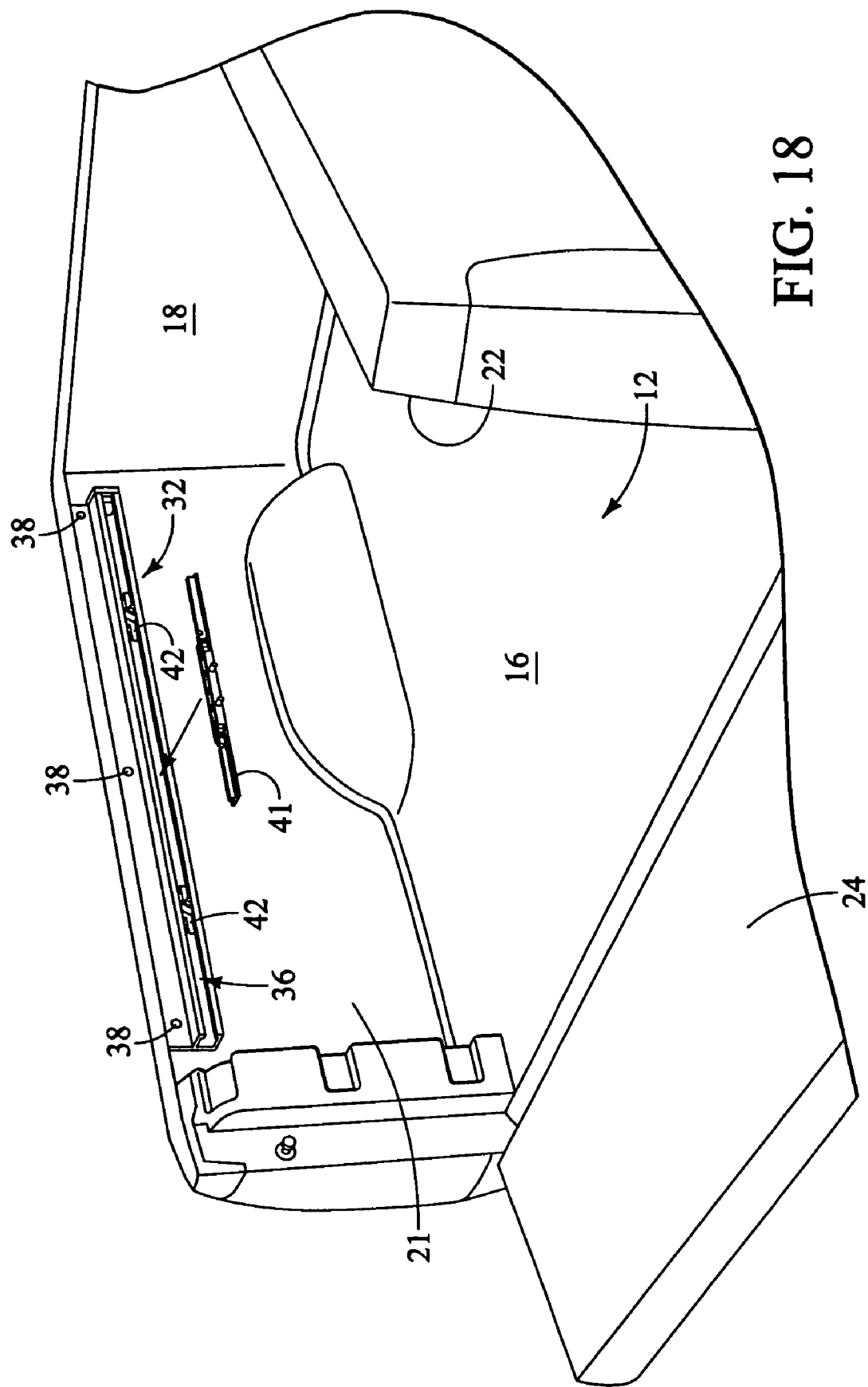
FIG. 18 is a partial perspective view of a portion of the cargo area with one of the elongated rails being installed into one of the tracks in accordance with the present invention.
Figure 19:
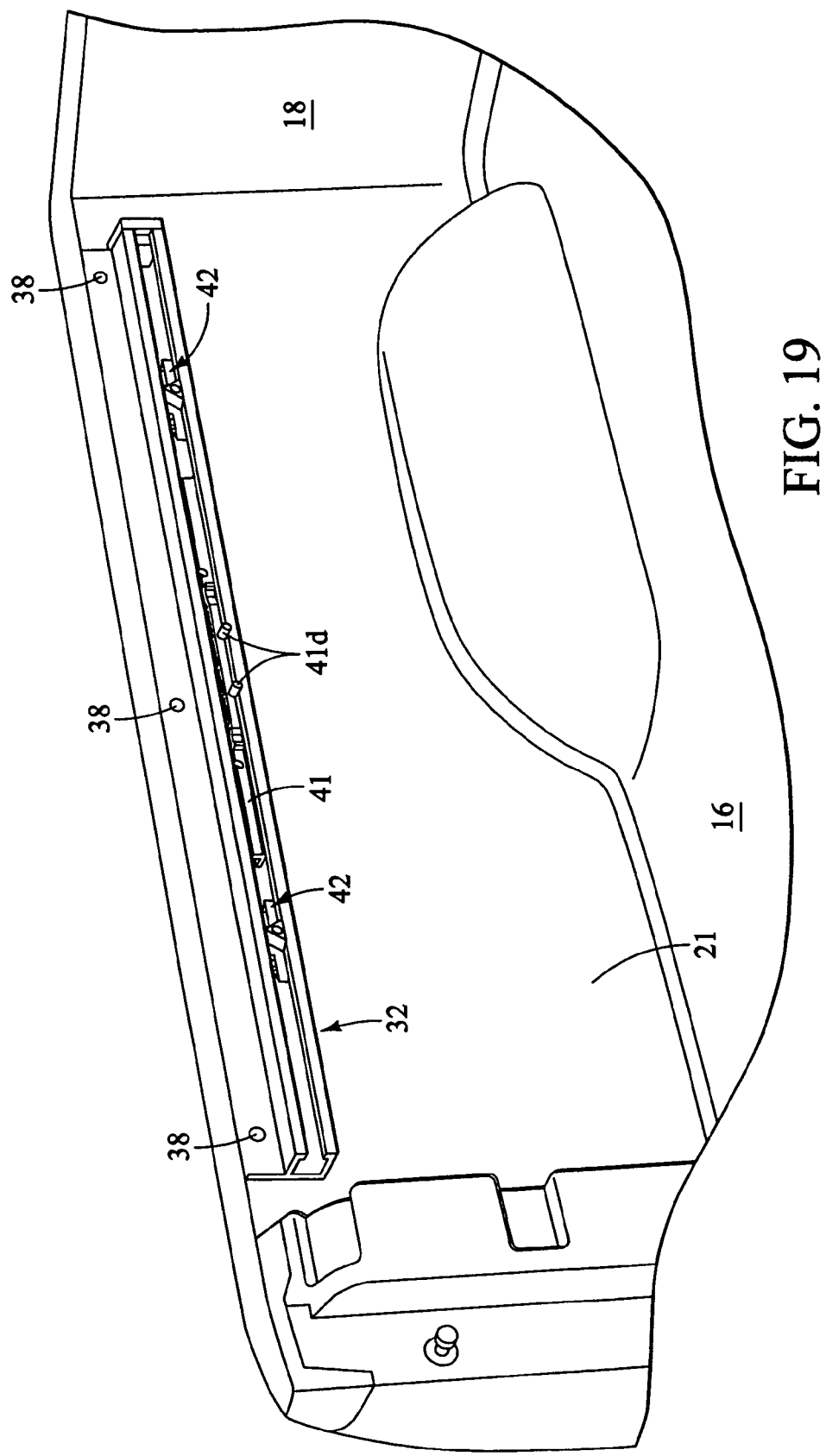
FIG. 19 is an enlarged partial perspective view of a portion of the cargo area with one of the elongated rails being installed into one of the tracks in accordance with the present invention.
Figure 22:
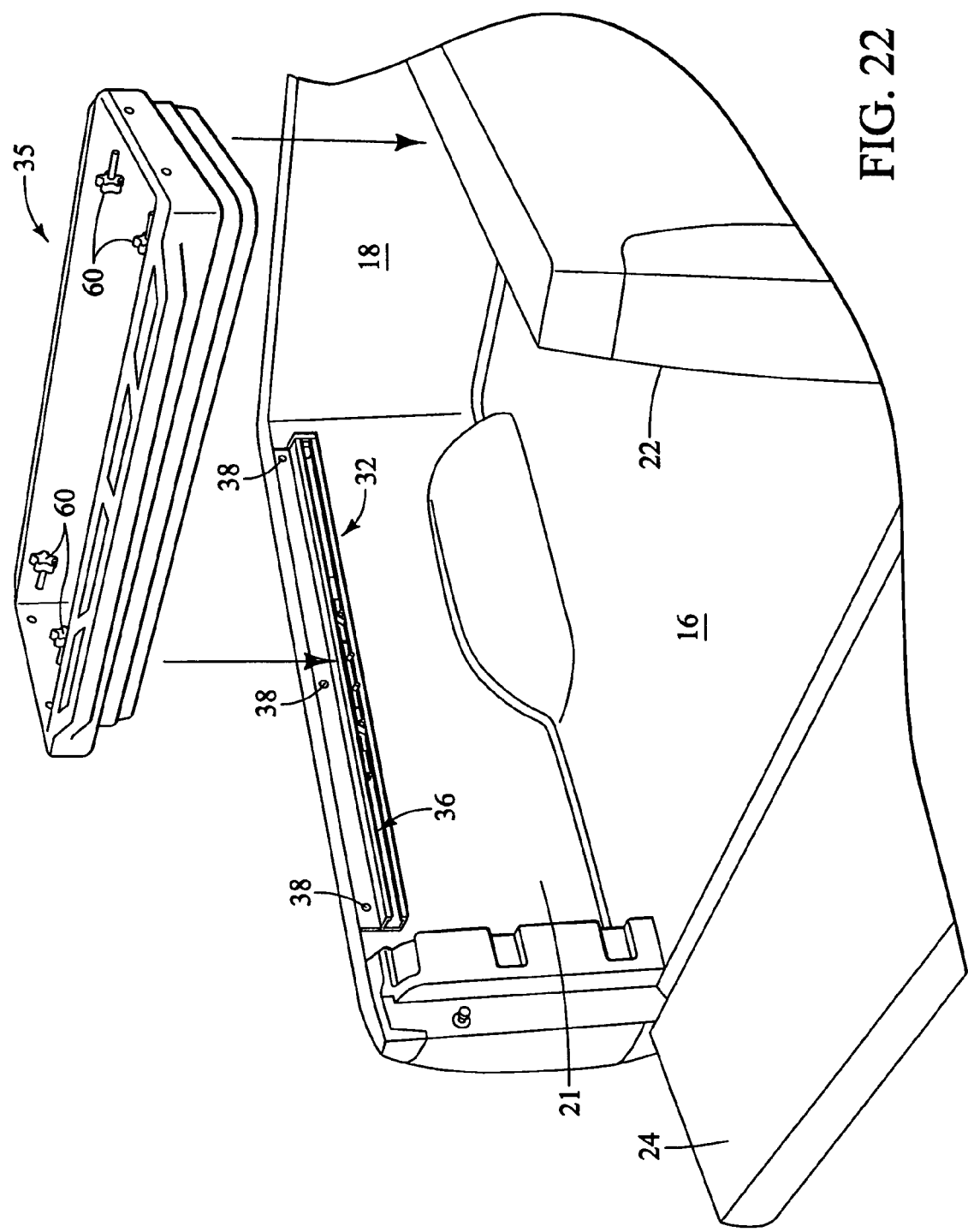
FIG. 22 is a partial perspective view of a portion of the cargo area with the upper tray (bed accessory) being connected to the mounting arrangements in accordance with the present invention.

Referring back to FIGS. 2 and 3 and to FIGS. 18 and 19, in this particular vehicle 10, the roller tracks 32 extend substantially the entire lengths of the first and second side cargo walls 21 and 22 of the vehicle cargo area 12. The roller tracks 32 have rear open ends located near rearward end abutments (taillight housing) of the first side cargo wall 21 and front open ends located near from the front cargo wall 18. The rearward end abutments of the cargo walls 21 and 22 are arranged so that the rear open ends of the roller tracks 32 are at least partial blocked, which prevents the mounting arrangements 33 and 34 from being installed longitudinally into the rear open ends of the roller tracks 32. Moreover, the spacings between the front open ends of the roller tracks 32 and the front cargo wall 18 are too close to each other so that the mounting arrangements 33 and 34 can not be installed longitudinally into the front open ends of the roller tracks 32.

The first and second mounting arrangements 33 and 34 are constructed of the identical parts. However, once the first and second mounting arrangements 33 and 34 are installed, the second mounting arrangement 34 is the mirror image of the first mounting arrangement 33. Thus, the identical parts of the first and second mounting arrangements 33 and 34 will be given the same reference numbers. Moreover, it will be apparent from this disclosure that the descriptions and illustrations of the first mounting arrangement 33 apply to the second mounting arrangement 34.

Figure 7:
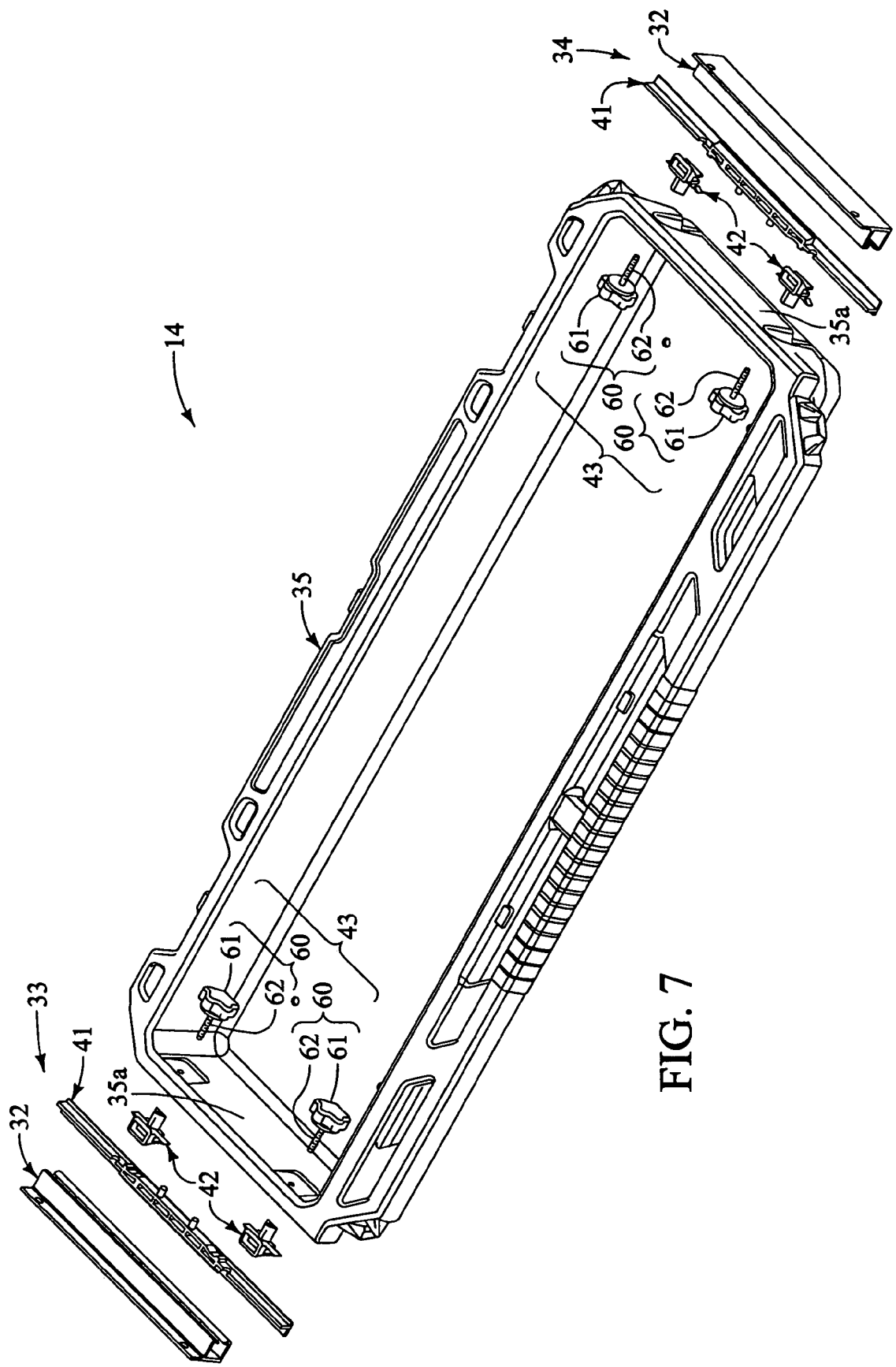
FIG. 7 is an exploded top perspective view of the sliding bed accessory arrangement in accordance with the present invention.
Figure 8:
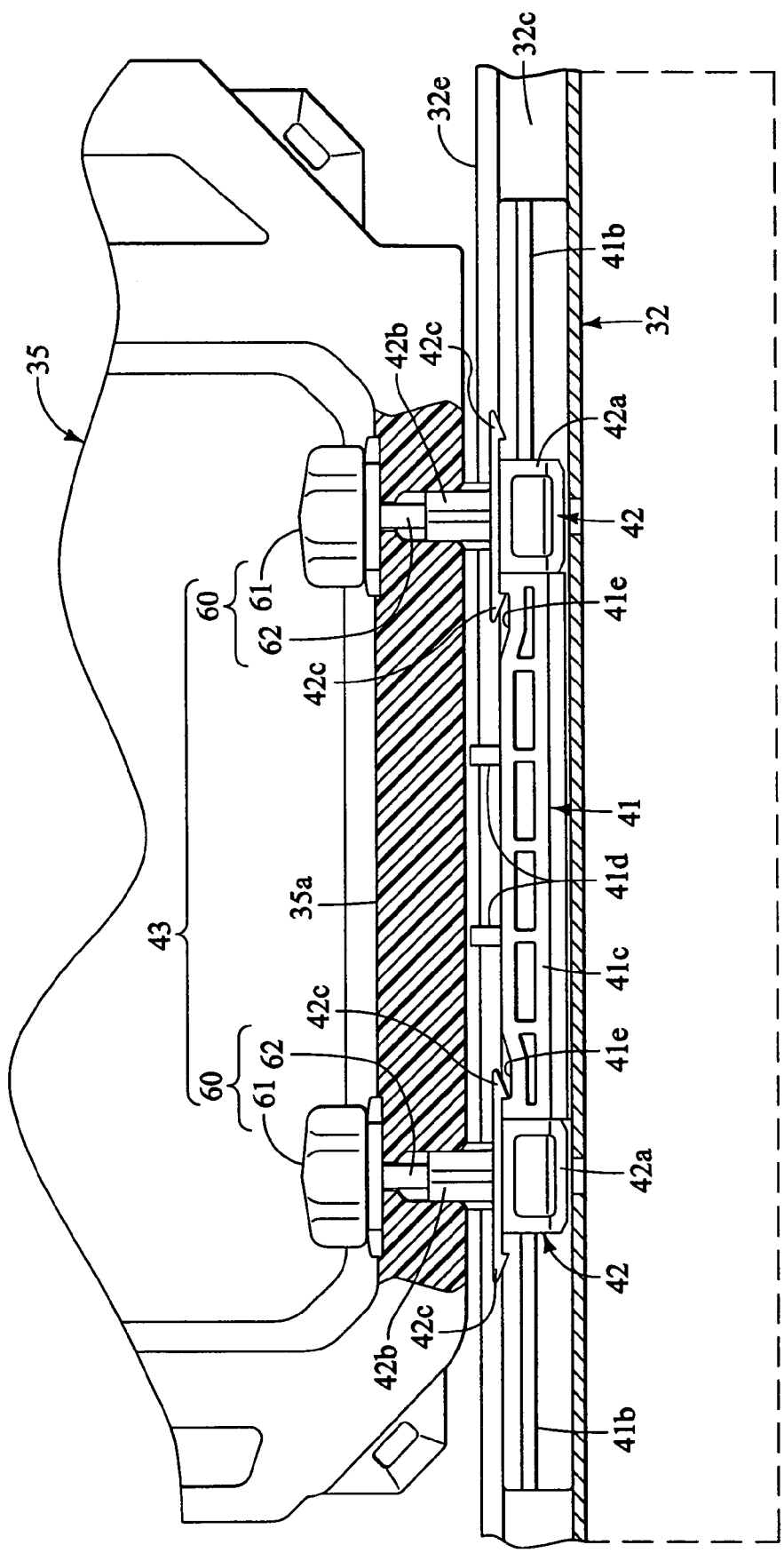
FIG. 8 is a partial top plan view of one side end of the sliding bed accessory arrangement with portions broken away for purposes of illustration.
Figure 15:
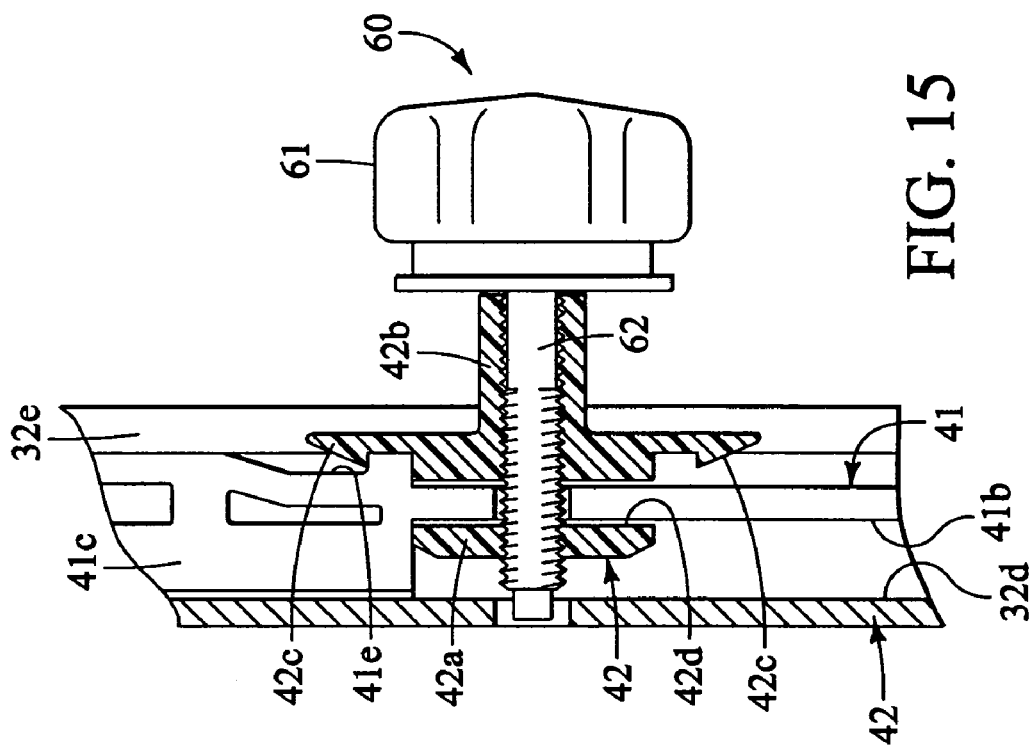
FIG. 15 is a cross sectional view of the mounting arrangement shown in FIG. 13, as viewed along section line 13-13 of FIG. 6, but with the upper tray removed.

Basically, as seen in FIG. 7, each of the first and second mounting arrangements 33 and 34 basically includes an elongated rail 41, a pair of connectors 42 and a locking mechanism 43. The elongated rail 41 is slideably disposed on one interior surface (i.e., the lower track portion 32c) of one of the tracks 32. The connectors 42 are coupled to opposite ends of the elongated rail 41. In particular, the connectors 42 are configured and dimensioned to be snap-fitted onto the opposite ends of the elongated rail 41. When the connectors 42 are coupled to the elongated rail 41, the connectors 42 engage or are at least very close to the interior surface of the upper track portion 32b, while the elongated rail 41 engages the interior surface of the lower track portion 32c. Thus, the elongated rail 41 and the connectors 42 cooperate together to retain and stabilize opposite ends of the elongated rail 41 within the respective one of the tracks 32.

As best seen in FIGS. 7-15, the elongated rails 41 are preferably constructed of a hard rigid material such a hard rigid plastic material. Each elongated rail 41 has a generally flat planer bottom surface 41a that slides along the lower track portion 32c of the respective one of the tracks 32. The elongated rail 41 preferably has first and second end portions 41b at a disposed on opposite sides of a central portion 41c. The end portions 41b have a generally inverted T-shaped configuration in transverse cross section as seen in FIGS. 12 and 14. The elongated rail 41 is sized such that it can be inserted into the tracks 32 through the elongated slot or opening 36. In other words, the elongated rails 41 are not inserted into the ends of the tracks 32. Rather, as explained below, the connectors 42 are coupled to the opposite ends of the elongated rail 41 so that the elongated rail 41 is retained and stabilized within the track 32.

The central portion 41c preferably has a pair of pins 41d that extends outwardly from one side of the central portion 41c. These pins 41d aid in the assembly process for coupling the connectors 42 to the elongated rail 41. In particular, the person grips these pins 41d to install the elongated rail 41 in one of the tracks 32 through the slot 36. Thus, once the elongated rail 41 is located in one of the tracks 32, then the pins 41d are located in the elongated slot or opening 36 of the track 32. The central portion 41c also preferably includes a pair of notches 41e that are located on the side of the elongated rail 41 that has the pins 41d. These notches 41e are configured and arranged to be engaged by the connectors 42 such that a snap-fit is formed therebetween.

As best seen in FIGS. 7-15, the connectors 42 are preferably identical to each other. Each of the connectors 42 includes a track engaging portion 42a, a mounting portion 42b and a pair of connecting portions 42c. Preferably, the connectors 42 are integrally formed as a one piece unitary member from a substantially rigid plastic material.

As best seen in FIGS. 12-15, the track engaging portion 42a has an uppermost part of the connector 42 that is configured and vertically dimensioned to stabilize opposite ends of the elongated rail 41 within the respective one of the tracks 32 and a lowermost part with a groove 42d that receives one of the inverted T-shaped end portion 41b of the elongated rail 41. The uppermost part of the track engaging portion 42a is vertically dimensioned to engage or at least be very close to engaging the interior surface of the upper track portion 32b to vertically stabilize opposite ends of the elongated rail 41 within the respective one of the tracks 32. In other words, once the connectors 42 are mounted on the elongated rail 41, the uppermost part of the track engaging portion 42a preferably is in contact or substantially close to the upper track portion 32b. The width of the track engaging portion 42a is configured and horizontally dimensioned to engage or at least be very close to engage the interior surfaces of the track portion 32d and 32e of the track 32 to horizontally stabilize opposite ends of the elongated rail 41 within the respective one of the tracks 32. In other words, the upper end of the track engaging portion 42a is shaped and dimensioned to span substantially the entire width of the interior area of the track between the rear wall portion 32b and the retaining lips 32e. Thus, very minimal horizontal play exists between the track 32 and the track engaging portion 42a of the connector 42.

The mounting portion 42b of the connector 42 preferably is a tubular member that projects from the track engaging portion 42a. The mounting portion 42b has a threaded hole for attaching the upper track bed tray 35 thereto via the locking mechanism 43 as discussed below. Thus, when the connectors 42 are coupled to the elongated rail 41 and disposed to one of the tracks 32, then the mounting portions 42b of the connectors 42 extend through the longitudinal slot or opening 36 of the tracks 32 so that the upper track bed tray 35 can be easily attached.

The connecting portions 42c are preferably elongated barb shaped members that extend from opposite ends of the track engaging portion 42a. These connecting portions 42c are cantilevered to be slightly resilient for forming a snap-fit with one of the notches 41e. In other words, when the connectors 42 are coupled to the elongated rail 41, one of the connecting portions 42c is resiliently (elastically) deformed or deflected upon engaging the central portion 41c of the elongated rail 41 so that the end of the connecting portion 42c is received in the notch 41e of the central portion 41c. Preferably the free end of the connecting portion 42c has a ramp configuration that aids in the connection.

The locking mechanism 43 preferably includes a pair of identical knob assemblies 60 that connect the upper track bed tray 35 to the connectors 42. Each of the knob assemblies 60 has a knob 61 with a threaded shaft 62. The threaded shaft 62 is configured and arranged to be threaded to the mounting portion 42b of one of the connectors 42. The knob assembly 60 not only connects the track bed tray 35 to the connectors 42, but also acts to lock the upper bed tray 35 in one of the plurality of longitudinal positions within the vehicle cargo area 12. In particular, by turning the knob 61 in clockwise direction, this causes the connectors 42 to be squeezed against the retaining lips 32e of the track 32 so that the upper track bed tray 35 is frictionally retained in the desired position within the vehicle cargo area 12.

The upper track bed tray 35 is preferably constructed of a hard rigid material such as a molded plastic material. In the illustrated embodiment, the upper track bed tray 35 is a box shaped member having an open upper end. Of course, it is apparent to those skilled in the art from this disclosure that the upper bed tray 35 could include a cover to close off the open upper end. This cover could be integrally molded therewith as a one piece unitary member or could be a separate cover that is fixedly mounted to the upper track bed tray 35. The upper track bed tray 35 has a pair of side end walls 35a with a pair of openings for receiving the threaded shafts 62 of the knob assemblies 60. Preferably, the elongated rails 41 run at least a majority of the length of the side walls 35a of the upper track bed tray 35. More preferably, the elongated rails 41 are sized and dimensioned to extend the full length of the side walls 35a of the upper track bed tray 35.

Figure 16:
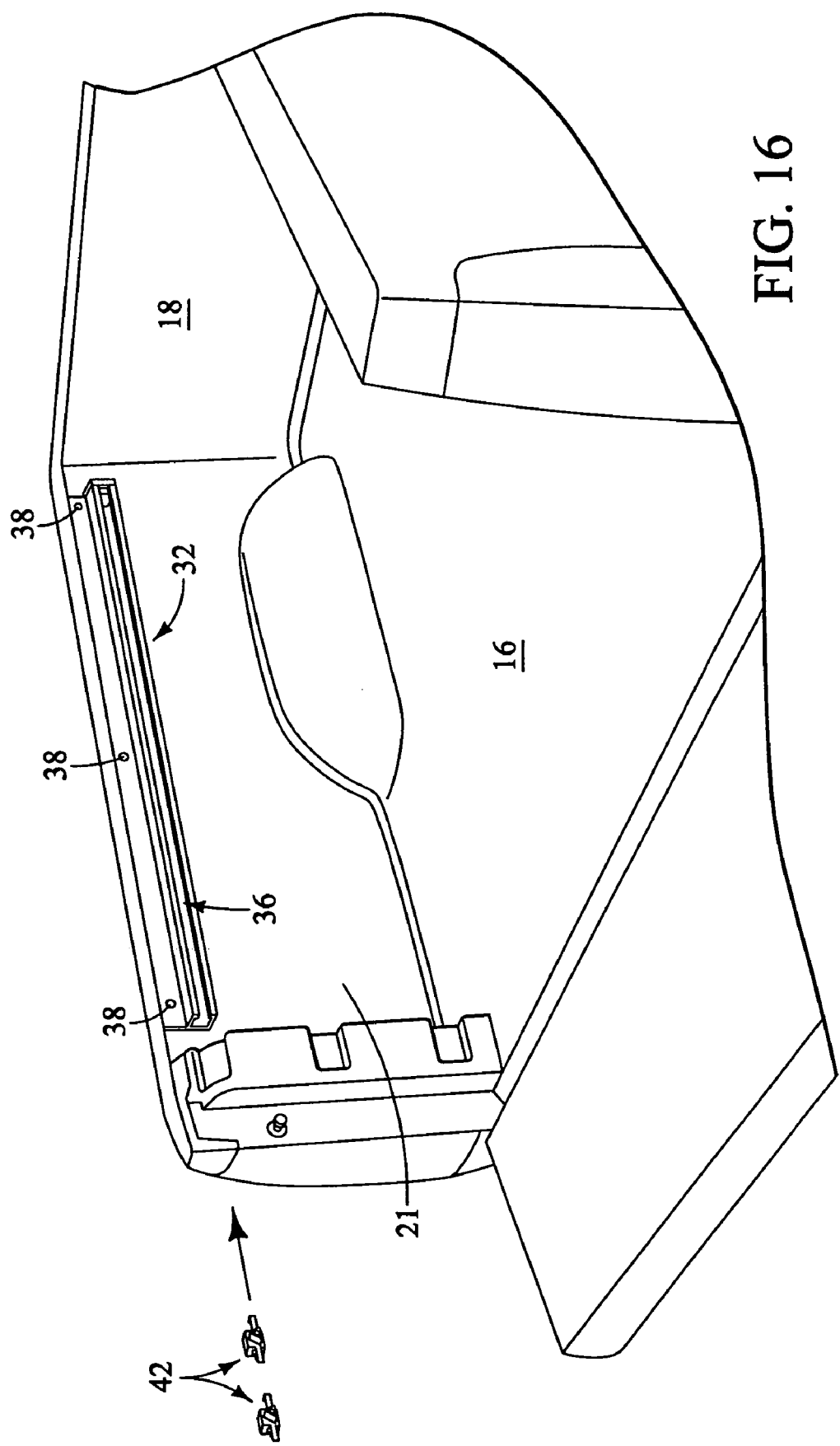
FIG. 16 is a partial perspective view of a portion of the cargo area with a pair of the connectors being installed into one of the tracks in accordance with the present invention.
Figure 17:
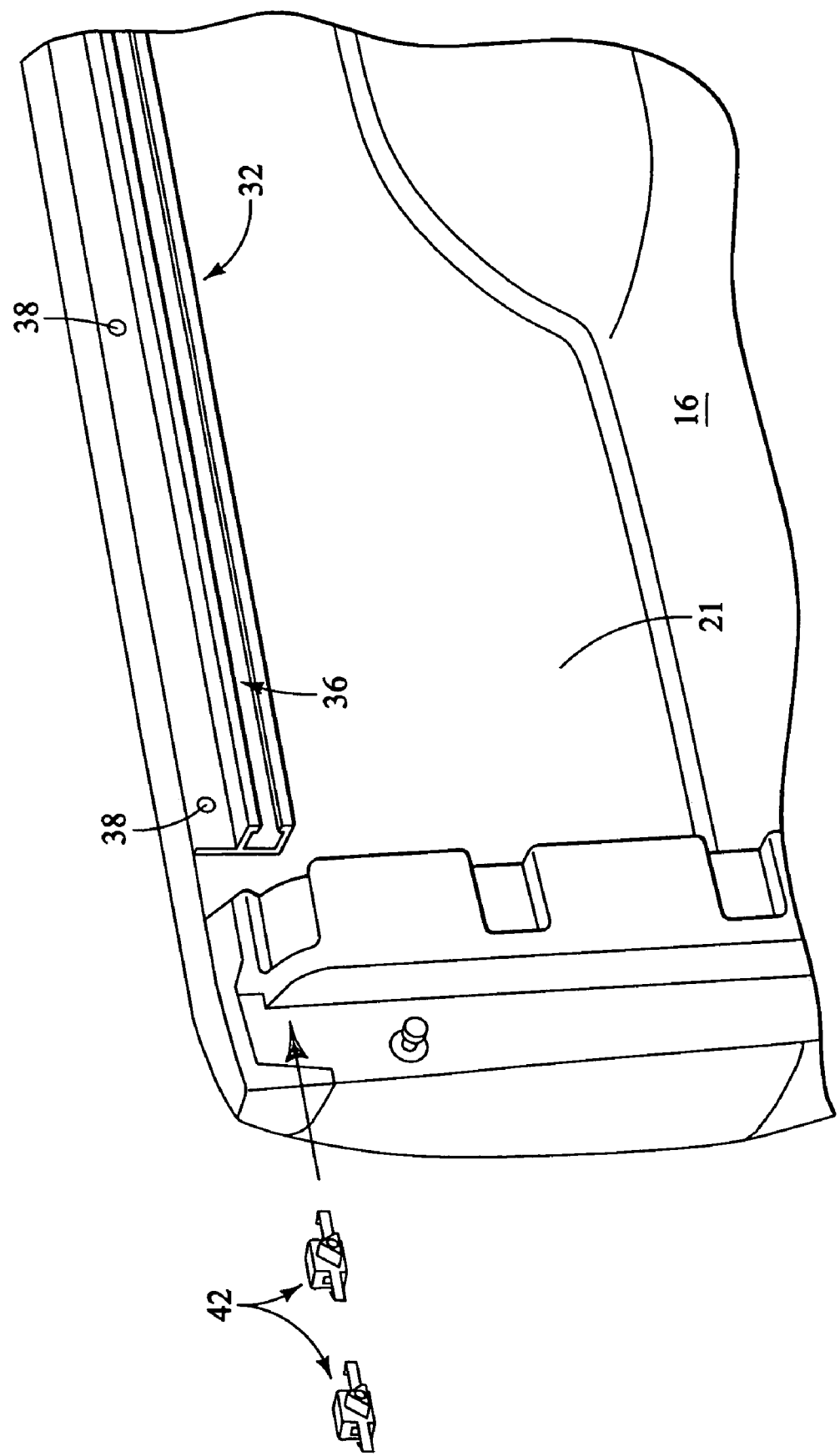
FIG. 17 is an enlarged partial perspective view of a portion of the cargo area with a pair of the connectors being installed into one of the tracks in accordance with the present invention.

Referring now to FIGS. 16-22, the installation of the sliding bed accessory arrangement 14 will now be discussed. First, the tracks 32 are mounted to the first and second side cargo walls 21 and 22, respectively, as previously seen in FIG. 2. As seen in FIG. 16, the next step is to install the connectors 42 into the tracks 32. Because the connectors 42 are very small, they can be easily inserted between a rear end of abutment (taillight housing) of the truck bed and the rear open end of the track 32. Once the connectors 42 are inserted into the tracks 32, the connectors 42 are separated by a space that is longer than the elongated rail 41 so that the elongated rails 41 can be received therebetween. The installer now grasps the pins 41d of the elongated rail 41 to insert the elongated rails 41 into the tracks 32. In particular, the elongated rails 41 are inserted into the tracks 32, respectively, through the longitudinal openings 36, so that the elongated rails 41 are located between connectors 42 in each of the tracks 32. In other words, the elongated rails 41 are not inserted through the rear or front open ends of the tracks 32. In fact, in the illustrated embodiment, the spacings between the vehicle body at the front and rear open ends of the tracks 32 are so small that the elongated rails 41 cannot possibly be inserted longitudinally into the tracks 32 if they were too large to be inserted through the longitudinal openings 36.

Once the elongated rails 41 are located in the tracks 32, respectively, the connectors 42 are moved onto the inverted T-shaped end portions 41b of each of the elongated rails 42. In particular, the inverted T-shaped end portions 41b are received in the grooves 42d of the connectors 42. Then, the connectors 42 are snap-fitted on to the central portion 41c. This snap-fit occurs by one of the connecting portions 42c of each of the connectors 42 being resiliently (elastically) deformed upon engagement with the central portion 41c of the elongated rail 41 so that the end of the connecting portion 42c is received in the notch 41e of the central portion 41c. Once the connectors 42 are secured to the elongated rails 41, each of the sub assemblies is moved towards the rear of the vehicle 10 such that the rear ends of the elongated rails 41 contacts an abutment (taillight housing) of the vehicle 10. In this position, the connectors 42 in the opposite tracks 32 will be laterally aligned so that the upper track bed tray 35 can be easily installed. Because the mounting portions 42b of the connectors 42 extend outwardly through the elongated slot or opening 36 of the tracks 32, the opposite side ends of the upper track bed 35 can rest on the mounting portions 42b of the connectors 42 for easy installation.

Finally, the upper track bed tray 35 can be secured to the connectors 42 by the knob assemblies 60. In particular, the shaft portions 61 of the knob assemblies 60 are inserted through the holes in the side walls 35a of the upper track bed tray 35 and then threaded to the mounting sections 42b of the connectors 42. Now, the upper track bed tray 35 can be secured in the desired location by tightening the knobs 61.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sliding bed accessory arrangement comprising:
   a vehicle cargo area including a bed floor, a front cargo wall disposed on a forward end of the bed floor, a first side cargo wall disposed on a first lateral side of the bed floor, and a second side cargo wall disposed on a second lateral side of the bed floor;
   a first track fixedly attached to the first side cargo wall of the vehicle cargo area, the first track including a first longitudinal side opening;
   a second track fixedly attached to the second side cargo wall of the vehicle cargo area in a parallel, spaced arrangement relative to the first track, the second track including a second longitudinal side opening that faces the first longitudinal side opening;
   a first mounting arrangement including a first elongated rail slideably disposed on one interior surface of the first track and a pair of first connectors coupled to opposite ends of the first elongated rail with the first connectors being configured and dimensioned relative to the first elongated rail and the first track to retain and stabilize opposite ends of the first elongated rail within the first track, a first bed accessory supporting part of the first mounting arrangement projects outwardly from the first longitudinal side opening of the first track into the vehicle cargo area;
   a second mounting arrangement including a second elongated rail slideably disposed on one interior surface of the second track and a pair of second connectors coupled to opposite ends of the second elongated rail with the second connectors being configured and dimensioned relative to the second elongated rail and the second track to retain and stabilize opposite ends of the second elongated rail within the second track, a second bed accessory supporting part of the second mounting arrangement projects outwardly from the second longitudinal side opening of the second track into the vehicle cargo area; and
   a bed accessory having first and second sides rigidly attached to the first and second mounting arrangements by first and second fasteners, respectively, the first and second sides of the bed accessory being laterally spaced apart by a first lateral distance that is smaller than a second lateral distance measured perpendicularly between the first and second tracks, the first and second bed accessory supporting parts of the first and second mounting arrangements being disposed with respect to the first and second sides of the bed accessory such that the first and second sides of the bed accessory are removably supported by the first and second bed accessory supporting parts of the first and second mounting arrangements when the first and second fasteners are detached from the first and second sides of the bed accessory with the first and second mounting arrangements installed to the first and second tracks, respectively.

2. The sliding bed accessory arrangement according to claim 1, wherein
    each of the first connectors is attached to the first elongated rail by the first fastener that also fastens the first elongated rail to the first side of the bed accessory; and
    each of the second connectors is attached to the second elongated rail by the second fastener that also fastens the second elongated rail to the second side of the bed accessory.

3. The sliding bed accessory arrangement according to claim 2, wherein
    each of the first fasteners cooperate with a respective one of the first connectors to selectively lock the first elongated rail relative to the first track; and
    each of the second fasteners cooperate with a respective one of the second connectors to selectively lock the second elongated rail to the second track.

4. The sliding bed accessory arrangement according to claim 3, wherein
    the first elongated rail has a cross sectional dimension along its entire length that is smaller than the first longitudinal side opening of the first track to be insertable into the first track in a first transverse direction through the first longitudinal side opening of the first track, while the first connectors have cross sectional dimensions that are larger than the first longitudinal side opening of the first track to be insertable into the first track in a first longitudinal direction through an end opening of the first track; and
    the second elongated rail has across sectional dimension along its entire length that is smaller than a second longitudinal side opening of the second track to be insertable into the second track in a second transverse direction through the second longitudinal side opening of the second track, while the second connectors have cross sectional dimentions that are larger than the second longitudinal side opening of the second track to be insertable into the second track in a second longitudinal direction through an end opening of the second track.

5. The sliding bed accessory arrangement according to claim 1, wherein
    the first elongated rail has a cross sectional dimension along its entire length that is smaller than a first longitudinal side opening of the first track to be insertable into the first track in a first transverse direction through the first longitudinal side opening of the first track, while the first connectors have cross sectional dimentions that are larger than the first longitudinal side opening of the first track to be insertable into the first track in a first longitudinal direction through an end opening of the first track; and
    the second elongated rail has a cross sectional dimension along its entire length that is smaller than a second longitudinal side opening of the second track to be insertable into the second track in a second transverse direction through the second longitudinal side opening of the second track, while the second connectors have cross sectional dimensions that are larger than the second longitudinal side opening of the second track to be insertable into the second track in a second longitudinal direction through an end opening of the second track.

6. The sliding bed accessory arrangement according to claim 1, wherein
    the first mounting arrangement includes at least one first locking mechanism configured to selectively lock the first elongated rail relative to the first track; and
    the second mounting arrangement includes at least one second locking mechanism configured to selectively lock the second elongated rail relative to the second track.

7. The sliding bed accessory arrangement according to claim 6, wherein
    the first locking mechanism is configured to press one of the first connectors against the first track to selectively lock the first elongated rail relative to the first track; and
    the second locking mechanism is configured to press one of the second connectors against the second track to selectively lock the second elongated rail relative to the second track.

8. The sliding bed accessory arrangement according to claim 7, wherein
    the first locking mechanism includes a first hand operating member and a first threaded shaft that is threadedly coupled to the one of the first connectors to move the first locking member transversely relative to the first track upon rotating the first hand operating; and
    the second locking mechanism includes a second hand operating member and a second threaded shaft that is threadedly coupled to the one of the second connectors to move the second locking member transversely relative to the second track upon rotating the second hand operating.

9. The sliding bed accessory arrangement according to claim 8, wherein
    the first threaded shaft attaches the one of the first connectors to the first elongated rail and also fastens the first elongated rail to the first side of the bed accessory; and
    the second threaded shaft attaches the one of the second connectors to the second elongated rail and also fastens the second elongated rail to the second side of the bed accessory.

10. The sliding bed accessory arrangement according to claim 9, wherein
    each of the first and second connectors are structurally identical.

11. The sliding bed accessory arrangement according to claim 9, wherein
    both of the first connectors being lockable to the first elongated rail in a structurally identical manner; and
    both of the second connectors being lockable to the second elongated rail in a structurally identical manner.

12. The sliding bed accessory arrangement according to claim 1, wherein
    the first connectors slideably contact an opposite interior surface of the first track from the one interior surface of the first track that the first elongated rail contacts to retain and stabilize the opposite ends of the first elongated rail within the first track; and
    the second connectors slideably contact an opposite interior surface of the second track from the one interior surface of the second track that the second elongated rail contacts to retain and stabilize the opposite ends of the second elongated rail within the second track.

13. The sliding bed accessory arrangement according to claim 12, wherein
    the opposite interior surface of the first track that the first connectors slideably contacts is an upwardly facing surface and the one interior surface of the first track that the first elongated rail slideably contacts is a downwardly facing surface; and
    the opposite interior surface of the second track that the second connectors slideably contacts is an upwardly facing surface and the one interior surface of the second track that the second elongated rail slideably contacts is a downwardly facing surface.

14. The sliding bed accessory arrangement according to claim 1, wherein
the first connectors are coupled by a snap-fit to the first elongated rail by being resiliently deformed upon engagement with the first elongated rail; and
the second connectors are coupled by a snap-fit to the second elongated rail by being resiliently deformed upon engagement with the second elongated rail.

15. The sliding bed accessory arrangement according to claim 1, wherein
the bed accessory is an upper tray having a top opening.

16. The sliding bed accessory arrangement according to claim 1, wherein
each of the first and second connectors are structurally identical.

17. The sliding bed accessory arrangement according to claim 1, wherein
both of the first connectors being lockable to the first elongated rail in a structurally identical manner; and
both of the second connectors being lockable to the second elongated rail in a structurally identical manner.

18. A sliding bed accessory arrangement comprising:
a vehicle cargo area including a bed floor, a front cargo wall disposed on a forward end of the bed floor, a first side cargo wall disposed on a first lateral side of the bed floor, and a second side cargo wall disposed on a second lateral side of the bed floor;
a first track fixedly attached to the first side cargo wall of the vehicle cargo area;
a second track fixedly attached to the second side cargo wall of the vehicle cargo area in a parallel, spaced arrangement relative to the first track;
a first mounting arrangement including a first elongated rail slideably disposed on one interior surface of the first track, a pair of first connectors attached to opposite ends of the first elongated rail within the first track and a pair of first fasteners removably attached to the first connectors, respectively, the first connectors being configured and dimensioned relative to the first elongated rail and the first track to retain and stabilize opposite ends of the first elongated rail within the first track when the first fasteners are detached from the first connectors;
a second mounting arrangement including a second elongated rail slideably disposed on one interior surface of the second track, a pair of second connectors attached to opposite ends of the second elongated rail within the second track and a pair of second fasteners removably attached to the second connectors, respectively, the second connectors being configured and dimensioned relative to the second elongated rail and the second track to retain and stabilize opposite ends of the second elongated rail within the second track when the second fasteners are detached from the second connectors; and
a bed accessory having first and second sides rigidly attached to the first and second mounting arrangements by the first and second fasteners; and wherein the first connectors are coupled by a snap-fit to the first elongated rail by being resiliently deformed upon engagement with the first elongated rail; and the second connectors are coupled by a snap-fit to the second elongated rail by being resiliently deformed upon engagement with the second elongated rail.

19. A sliding bed accessory arrangement comprising:
a vehicle cargo area including a bed floor, a front cargo wall disposed on a forward end of the bed floor, a first side cargo wall disposed on a first lateral side of the bed floor, and a second side cargo wall disposed on a second lateral side of the bed floor;
a first track fixedly attached to the first side cargo wall of the vehicle cargo area, the first track including a first longitudinal side opening and a first pair of holes located on an opposite side of the first track from the first longitudinal side opening;
a second track fixedly attached to the second side cargo wall of the vehicle cargo area in a parallel, spaced arrangement relative to the first track, the second track including a second longitudinal side opening and a second pair of holes located on an opposite side of the second track from the second longitudinal side opening;
a first mounting arrangement including a first elongated rail slideably disposed on one interior surface of the first track and a pair of first connectors disposed on opposite ends of the first elongated rail within the first track;
a second mounting arrangement including a second elongated rail slideably disposed on one interior surface of the second track and a pair of second connectors disposed on opposite ends of the second elongated rail within the second track;
a pair of first knob assemblies with each of the first knob assemblies having a first knob with a first threaded shaft;
a pair of second knob assemblies with each of the second knob assemblies having a second knob with a second threaded shaft; and
a bed accessory having a first side removably attached to the first connectors by the first knob assemblies and a second side removably attached to the second connectors by the second knob assemblies,
the first threaded shafts of the first side of the first knob assemblies having an axial dimension relative to the first track and the bed accessory such that free ends of the first threaded shafts extend through holes in the first connectors and engage the first pair of holes of the first track when the bed accessory is not installed, and such that the free ends of the first threaded shafts are spaced from the first pair of holes of the first track when the bed accessory is installed,
the second threaded shafts of the second side of the first knob assemblies having an axial dimension relative to the second track and the bed accessory such that free ends of the second threaded shafts extend through holes in the second connectors and engage the second pair of holes of the second track when the bed accessory is not installed, and such that the second ends of the second threaded shafts are spaced from the second pair of holes of the second track when the bed accessory is installed.

20. The sliding bed accessory arrangement according to claim 19, wherein
he first connectors are coupled by a snap-fit to the first elongated rail by being resiliently deformed upon engagement with the first elongated rail; and
the second connectors are coupled by a snap-fit to the second elongated rail by being resiliently deformed upon engagement with the second elongated rail.

* * * * *